(12) United States Patent
Subbaroyan et al.

(10) Patent No.: US 8,117,200 B1
(45) Date of Patent: Feb. 14, 2012

(54) PARALLELIZING GRAPH COMPUTATIONS

(75) Inventors: Ram Subbaroyan, San Francisco, CA (US); Anand Rajaraman, Palo Alto, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 480 days.

(21) Appl. No.: 11/332,848

(22) Filed: Jan. 13, 2006

Related U.S. Application Data

(60) Provisional application No. 60/644,324, filed on Jan. 14, 2005.

(51) Int. Cl.
*G06F 7/00* (2006.01)
*G06F 17/30* (2006.01)
(52) U.S. Cl. .................... 707/736; 709/201
(58) Field of Classification Search .............. 707/104.1, 707/705, 706, 709, 736, 748; 709/226, 244, 709/238, 222, 202, 201, 208; 708/104
See application file for complete search history.

(56) References Cited

U.S. PATENT DOCUMENTS

| | | | | |
|---|---|---|---|---|
| 6,321,220 | B1 * | 11/2001 | Dean et al. ..................... | 707/3 |
| 7,058,628 | B1 * | 6/2006 | Page ............................. | 707/5 |
| 7,493,320 | B2 * | 2/2009 | Canright et al. ................ | 707/5 |
| 2003/0177240 | A1 * | 9/2003 | Gulko et al. .................. | 709/226 |
| 2003/0204502 | A1 * | 10/2003 | Tomlin et al. ................. | 707/5 |
| 2005/0144162 | A1 | 6/2005 | Liang | |
| 2005/0262050 | A1 * | 11/2005 | Fagin et al. .................. | 707/3 |

OTHER PUBLICATIONS

K. Sankaralingam, S. Sethumadhavan, and J. Browne. Distributed Pagerank for P2P Systems. In Proceedings of the 12th IEEE International Symposium on High Performance Distributed Computing (HPDC'03), IEEE, 2003.*
Borodin et al., Finding Authorities and Hubs From Link Structures on the World Wide Web, in Proceedings of The Tenth International World Wide Web Conference, Jan. 18, 2002.
Jeh et al., Scaling Personalized Web Search, in Proceedings of the Twelfth International World Wide Web Conference, 2003.
Jon M. Kleinberg, Authoritative Sources in a Hyperlinked Environment, Journal of the ACM, 1999.
Lempel et al., The Stochastic Approach for Link-Structure Analysis (SALSA) and the TKC Effect, 2000.
Ng et al., Stable Algorithms for Link Analysis, in Proceedings the Twenty-Fourth Annual International ACM SIGIR Conference, 2001.
Page et al., The PageRank Citation Ranking: Bringing Order to the Web, 1998.
Richardson et al., The Intelligent Surfer: Probabilistic Combination of Link and Content Information in PageRank, 2002.
Soumen Chakrabarti, Mining the Web: Discovering Knowledge from Hypertext Data, 2002.

* cited by examiner

*Primary Examiner* — Marc Somers
(74) *Attorney, Agent, or Firm* — Van Pelt, Yi & James LLP

(57) ABSTRACT

Performing an operation on a web graph is disclosed. A plurality of computers is initialized. The web graph is divided into portions. The portions are distributed to the plurality of computers. The results of the computation are propagated from the plurality of the computers to each of the plurality of computers. Optionally, a coordinator is used.

20 Claims, 2 Drawing Sheets

PARALLELIZING GRAPH COMPUTATIONS

CROSS REFERENCE TO OTHER APPLICATIONS

This application claims priority to U.S. Provisional Patent Application No. 60/644,324 entitled PARALLEL ALGORITHMS FOR GRAPH COMPUTATIONS filed Jan. 14, 2005 which is incorporated herein by reference for all purposes.

BACKGROUND OF THE INVENTION

A web graph is a representation of the link structure of the World Wide Web (hereinafter the "web"). The graph can be encoded in a variety of data structures, including a matrix. For example, the links between documents in the web can be encoded in the rows and columns of the matrix. As the web contains billions of documents, even a modestly comprehensive matrix representation of the web will be sparse and very large.

The web graph can be used to perform a variety of computations. One example is Page Rank. Due to the size and other properties of the web graph, computations can be very resource intensive. There thus exists a continuing need to be able to process the web graph efficiently.

BRIEF DESCRIPTION OF THE DRAWINGS

Various embodiments of the invention are disclosed in the following detailed description and the accompanying drawings.

DETAILED DESCRIPTION

Figure 1:
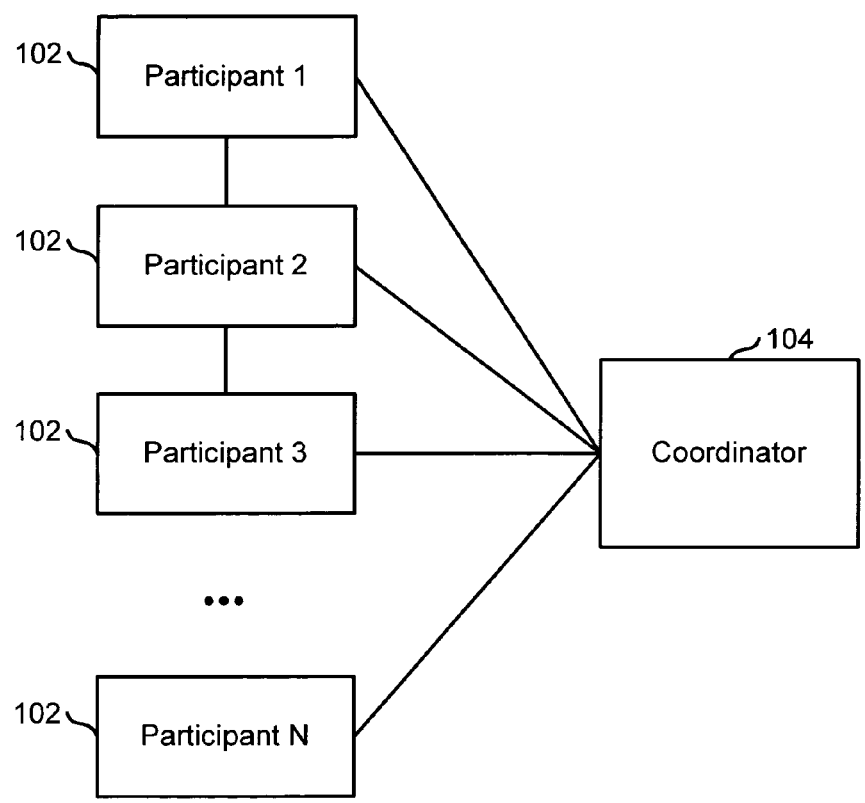
FIG. 1 illustrates an embodiment of a system for performing parallelized graph computations.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A web graph can be constructed from information related to the link structure of the web. The link structure is typically obtained by a crawler, which crawls the web and process the information—storing it in a web database that is spread across multiple computers. As used herein, the web graph may include information related to other collections of documents, such as may reside on an intranet.

Suppose the link structure is encoded in an N×N matrix A, with the rows and columns corresponding to the N pages in the web. If page j links to page i, then $$A_{ij} = \frac{1}{|Out(j)|},$$

and if not, $A_{ij}=0$.

Assorted computations including matrix A can be performed. One example is a value computation, which can be used, for example, for computing arbitrary link-propagated properties such as Page Rank. Another example is a state computation, which can be used, for example, in computing subgraphs of the web graph. State computations can be thought of as a strict subclass of value computations. When the term web graph is used herein, as applicable, data structures used to encode the web graph may be substituted. For example, if an operation is described as being performed on a portion of the web graph, the computation may be performed on a portion of matrix A, as applicable.

As described in more detail below, both state and value computations can be parallelized. These computations can be performed entirely in memory, without resorting to disk reads at all (except for initialization), and with reasonable communication overhead.

FIG. 1 illustrates an embodiment of a system for performing parallelized graph computations. In the example shown, a plurality of participants 102 and a coordinator 104 are present. Participants 102 receive portions of the web graph upon which computations are performed. In this example, a crawler (not shown) crawls the web and processes the link information that it obtains. The link information is distributed across participants 102, which store the information in relational databases. In some embodiments, other configurations are employed to store the information extracted by the crawler. For example, in some embodiments, the information is stored in a web database, which may be spread across multiple computers that are not participants 102. In that case, participants 102 may receive copies of portions of the data, rather than being the primary storage site of the web graph.

In some embodiments, coordinator 104 also receives portions of the web graph (i.e., it is also a participant 102). In some embodiments, coordinator 104 is a compute node. In some embodiments, coordination logic resides on each of the participants 102 and a separate coordinator 104 is omitted. This may be the case, for example, when the User Datagram Protocol (hereinafter "UDP") is employed for communication.

State Computations

The web database is partitioned across several participants 102. State graph computations can be parallelized by executing pieces of the computation in parallel across the participants 102.

Figure 2:
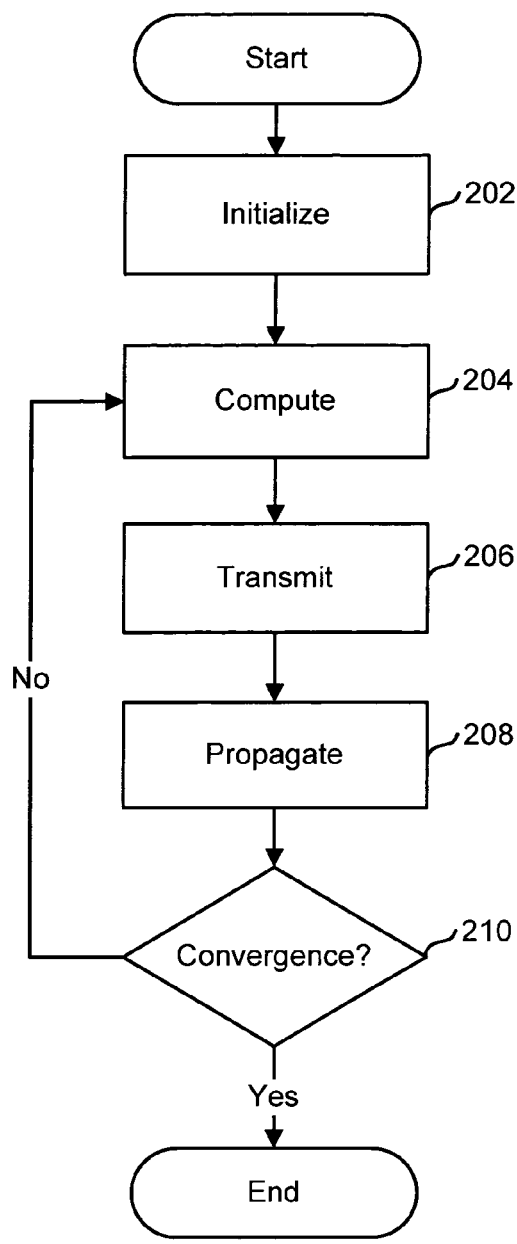
FIG. 2 illustrates an embodiment of a process for performing an operation on a web graph.

FIG. 2 illustrates an embodiment of a process for performing an operation on a web graph. The process of FIG. 2 may be used, for example, to perform the multiplication of a large, sparse matrix, and a large vector. The process begins at 202 when initialization occurs. In this example, coordinator 104 computes the initial value of the state vector (encoded as a bit vector) and transmits it to all participants 102.

At 204, each participant 102 updates a contiguous segment of the bit vector. In some cases, it may read other portions of the bit vector. The portion updated by each participant 102 corresponds to the set of pageIDs at the participant 102.

At 206, each participant 102 transmits its portion of the state vector to coordinator 104.

At 208, coordinator 104 pieces together the entire state vector and sends the new bit vector to the participants 102. In some embodiments, before propagating, coordinator 104 determines whether the state vector has changed since the last iteration. One way of doing this is to have each participant 102 test its portion for changes and transmit a bit, and have coordinator 104 OR those bits. Coordinator 104 can also compare new and old state vectors.

The process continues (204-208) until convergence is achieved (210).

An analysis of the communication overhead of one implementation of the process depicted in FIG. 2 is performed below. Suppose there are a total of N pages distributed equally across s storage nodes each storing n pages. Then, N=ns. Suppose the state vector requires k bits per page. In this example, assume that coordinator 104 is not one of the participants 102.

Here, the amount of data transmitted at 206 is equal to the size of the state vector, or Nk bits.

At 208, the entire state vector is transmitted to each participant 102. In this example, coordinator 104 needs to transmit to each participant 102 only the portions of the state vector that were computed at other participants; therefore, the data transmitted is (N−n)ks bits.

The total number of bits transmitted per iteration is given by:

$$Nk+(N-n)ks=Nk+Nks-nks=Nks \quad (1)$$

Where ns=N.

If one billion pages are distributed across 32 nodes, and k=1, the communication overhead per iteration in this example is 32 gigabits. In one embodiment, the nodes are connected using gigabit Ethernet. Assuming 50% capacity utilization, the coordination in this example requires 64 seconds, or approximately 1 minute per iteration. If four billion pages are distributed across 128 nodes (assuming 32M pages per node), the overhead is sixteen minutes per iteration in this example. A technique to optimize this approach is presented below.

Each participant 102 can perform its computation entirely in memory. The state vector is stored in memory. The link structure can also be stored completely in memory. One way of doing this is to encode the data about pages and links as follows. For each page, store only its inlinks (not the outlinks). Typically, each page in the web graph has an average of approximately ten inlinks. Suppose for each node, its SeqNum is stored, as well as the SeqNums of all of its inlinks. In this example, SeqNums are 32 bits (4 bytes). The storage per node is 44 bytes. In some embodiments, simple delta compression is used to reduce the storage.

Assuming 50 bytes per node, the total for 32 million nodes in this example is 1.6 GB. In addition, Nk bits are needed for the state vector. For 4 billion pages and k=1, this works out to 500 MB; for k=2, this works out to 1 GB. The total working set at each participant 102 is thus under 3 GB. Coordinator 104 needs Nk bits for the state vector.

Thus, once the data structures are initialized in memory at 202, the computation can be performed entirely in memory without ever needing disk access. In contrast, a centralized approach would require a sequential scan of the entire link data from disk.

Broadcast Optimization

It was determined above that the communication overhead per iteration in one example is Nsk bits. Assuming a constant number n (32 million) pages per participant, s=N/n and so the communication overhead is $N^2k/n$ bits per iteration.

The Transmit (206) and Propagate (208) steps above make use of a unicast network, such as TCP. In some embodiments, UDP is used instead and 206 and 208 are modified accordingly to use the broadcast address, which is subnet mask:255. Packets sent to this address are read by every host on the network. In some embodiments, a messaging layer is written on top of UDP. In some embodiments, software such as that provided by TIBCO Software Inc. is used.

Using the broadcast capability, the Transmit (206) and Propagate (208) steps are combined into a single step. In this case, coordinator 104 is not needed. Each participant broadcasts the portion of the state vector it has recomputed; every other participant reads it. Each participant thus reconstructs the entire state vector. The total number of bits transmitted is nk per participant, so the total is snk=Nk. Thus, the communication overhead increases linearly in N.

In this example, for one billion documents and k=1, the communication per iteration is one gigabit. Assuming 50% capacity utilization on a gigabit Ethernet network, the overhead is two seconds. For four billion documents, the overhead is just eight seconds.

Value Computations

One example of a value computation is Page Rank. The methods described below in conjunction with parallelizing a Page Rank computation can be generalized to other value computations, such as the methods described in U.S. patent application Ser. No. 11/165,623, entitled DOUBLE ITERATIVE FLAVORED RANK ("DIFR"), filed Jun. 22, 2005 which is incorporated herein by reference for all purposes.

In some embodiments, the unicast and broadcast implementations discussed in conjunction with the process of FIG. 2 above (for state computations) are adapted for value computations. As described in more detail below, a more efficient method of performing a value computation can also be used.

When using the above unicast/broadcast methods for a value computation, the communication overhead can be determined as follows. Using the vector of Page Rank values as the "state vector" in this example, using single precision floating point numbers, the communication overhead is $N^2k/n$ bits, where k=32 bits. For one billion documents, with 32 million documents per participant 102, the overhead in a naive unicast implementation is one terabit per iteration. Using the broadcast variant, the overhead drops down to Nk bits, or 32 gigabits. On a gigabit Ethernet with 50% utilization, that works out to an overhead of approximately 1 minute. For four billion documents, the overhead is 4 minutes.

Here, the memory requirement at each participant to store the Page Rank vector is Nk bits, or four gigabytes for one billion documents, and sixteen gigabytes for four billion documents.

One way to improve memory consumption is as follows. Each participant 102 needs to store in memory only a subset of the Page Rank vector: the ranks of pages that link to pages stored at this participant. On average, each page has ten inlinks; using this metric, 10n Page Rank values would be stored at each participant, occupying 40n bytes. Since n=32 million, that works out to 1.28 GB of space. The total memory needed at each participant is therefore 1.28 GB for the vector subset and 1.6 GB for the link data, or around 3 GB, which will comfortably fit in memory.

Since only a subset of the Page Rank vector is stored, in this example, the corresponding SeqNums are stored as well. Without optimization, this could double the memory requirement to 80n bytes and require a binary search to find the Page Rank for a given SeqNum.

The memory requirements can be reduced as follows. The link data structure stores, for each page, its SeqNum and the SeqNums of the pages linking to it. The Page Rank of the page itself can be added to this. Thus, for the n pages stored, Page Rank can be stored using only 4n additional bytes.

The link data structure described above is very close to the matrix data structure. The difference is that inlinks are stored instead of outlinks. As a result, the modified Page Rank computation can be considered a parallel matrix multiplication algorithm. Operators such as $\mu$ and $\theta$ can also operate in parallel in a very natural manner.

Typically, about 30% of the links (i.e., 3 links) to a page are interhost links; the other 70% are intrahost links. If all pages from a host are stored in the same portion of the web graph, only ranks for 3n additional pages need be stored in the form (SeqNum, PageRank), taking up 24n bytes.

The memory requirement for the Page Rank vector is thus 28n bytes, or less than 1 GB for 32 million nodes. The total memory required for the link data and the Page Rank vector subset is less than 3 GB, which fits comfortably in memory.

Thus, if the broadcast process is used with the vector subset optimization, value computations (such as Page Rank) can be performed completely in memory with very little communication overhead.

The unicast process can also be optimized. In this example, in the Transmit step (206), each participant transmits its portion of the vector to the coordinator, requiring a total of Nk bits of transmission. In the Propagate step (208), however, the coordinator needs to propagate on average only 3n Page Rank values to each participant, for a total of 3 nsk=3Nk bits. The total overhead is therefore 4Nk bits per iteration. For one billion pages, that works out to 96 gigabits, or approximately 192 seconds (i.e., 3 minutes) of coordination overhead per iteration, under the assumption of a 50% utilized gigabit Ethernet.

Although the foregoing embodiments have been described in some detail for purposes of clarity of understanding, the invention is not limited to the details provided. There are many alternative ways of implementing the invention. The disclosed embodiments are illustrative and not restrictive. For example, the techniques described above can be adapted for use with any large, sparse matrix computation, and are not limited to web graph computations.

What is claimed is:

1. A method of performing an operation on a web graph comprising:
   initializing a plurality of computers;
   dividing, using at least one processor, the web graph into a plurality of portions, wherein the web graph includes a representation of the link structure of a collection of documents, and wherein a first document included in the collection of documents has at least one inlink and at least one outlink;
   distributing the plurality of portions to a plurality of computers, wherein distributing includes:
   distributing a first portion in the plurality of portions to a first computer included in the plurality of computers;
   wherein the first portion includes a representation of the at least one inlink of the first document and does not include a representation of the at least one outlink of the first document; and
   propagating results of computations performed by the plurality of the computers to each of the plurality of computers.

2. The method of claim 1 wherein the computation is a state computation.

3. The method of claim 1 wherein the computation is a value computation.

4. The method of claim 1 wherein the initializing includes initializing a computation vector.

5. The method of claim 1 wherein the computation is a vector multiplication.

6. The method of claim 1 wherein the results are propagated via the Transmission Control Protocol.

7. The method of claim 1 wherein the results are propagated via the User Datagram Protocol.

8. The method of claim 1 further comprising receiving results of the computations from the plurality of computers.

9. The method of claim 1 wherein the results of the computation are distributed at least in part by a coordinator.

10. The method of claim 1 wherein the portions are distributed to a plurality of computers at least in part by a coordinator.

11. The method of claim 1 wherein multiple iterations of distributing and propagating are performed until convergence is reached.

12. A system for performing an operation on a web graph comprising:
    a first computer participant; and
    a second computer participant, wherein the second computer participant is configured to:
    receive a portion of the web graph, wherein the web graph includes a representation of the link structure of a collection of documents;
    perform a computation; and
    propagate results of the computation to the first computer participant;
    wherein a first document included in the collection of documents has at least one inlink and at least one outlink, and wherein the portion received by the second computer participant includes a representation of the at least one inlink of the first document and does not include a representation of the at least one outlink of the first document.

13. The system of claim 12 wherein the computation is a state computation.

14. The system of claim 12 wherein the computation is a value computation.

15. The system of claim 12 wherein the computation is a vector multiplication.

16. The system of claim 12 wherein the plurality of participants are configured to iteratively perform a plurality of computations and propagate results until convergence is reached.

17. The system of claim 12 further comprising a coordinator.

18. The system of claim 17 wherein the coordinator is configured to communicate with the plurality of participants via the Transmission Control Protocol.

19. The method of claim 17 wherein the coordinator is configured to communicate with the plurality of participants via the User Datagram Protocol.

20. A computer program product for performing an operation on a web graph, the computer program product comprising a computer readable storage medium and comprising computer instructions for:
- initializing a plurality of computers;
- dividing the web graph into a plurality of portions, wherein the web graph includes a representation of the link structure of a collection of documents, and wherein a first document included in the collection of documents has at least one inlink and at least one outlink;
- distributing the plurality of portions to a plurality of computers, wherein distributing includes:
  - distributing a first portion in the plurality of portions to a first computer included in the plurality of computers;
  - wherein the first portion includes a representation of the at least one inlink of the first document and does not include a representation of the at least one outlink of the first document; and
- propagating results of computations performed by the plurality of the computers to each of the plurality of computers.

* * * * *